United States Patent [19]

Obrecht et al.

[11] Patent Number: 5,064,904
[45] Date of Patent: Nov. 12, 1991

[54] SUITABLE POLYCHLOROPRENE MATERIALS FOR THE PRODUCTION OF HIGH-DAMPING VULCANISATES

[75] Inventors: Werner Obrecht, Moers; Heinz-Hermann Greve, Cologne; Peter Wendling; Ulrich Eisele, both of Leverkusen; Rüdiger Musch, Bergisch Gladbach, all of Fed. Rep. of Germany

[73] Assignee: Bayer AG, Leverkusen, Fed. Rep. of Germany

[21] Appl. No.: 495,896

[22] Filed: Mar. 19, 1990

[30] Foreign Application Priority Data

Mar. 29, 1989 [DE] Fed. Rep. of Germany ....... 3910101

[51] Int. Cl.$^5$ ..................... C08L 11/02; C08L 27/12
[52] U.S. Cl. .................................... 525/199; 525/215
[58] Field of Search ............................. 525/199, 215

[56] References Cited

U.S. PATENT DOCUMENTS 3,002,938 10/1961 Gagne .................................. 525/199
3,541,872 11/1970 Fix et al. .
3,661,823 5/1972 Fix et al. .
4,781,979 11/1988 Wilkis et al. ........................ 428/390

FOREIGN PATENT DOCUMENTS 2001385 9/1969 France .
2108974 5/1983 United Kingdom .

Primary Examiner—Jacob Ziegler
Attorney, Agent, or Firm—Connolly and Hutz

[57] ABSTRACT

Vulcanizates of polychloroprene materials containing fluorinated polyolefin have a decreased rebound elasticity without having a significantly adverse effect on the mechanical properties.

10 Claims, No Drawings

SUITABLE POLYCHLOROPRENE MATERIALS FOR THE PRODUCTION OF HIGH-DAMPING VULCANISATES

This invention relates to materials containing polychloroprene and fluorinated polyolefin, to a process for the production of such materials and to the use thereof in the production of high-damping vulcanisates.

Polychloroprene rubbers are suitable for the production of low-damping vulcanisates as they are used, for example, for tire treads (DI Schurig, Ed. Rubber Division Symposia, Vol I, 122nd Meeting of the Rubber Division, ACS Chicago, Ill., Oct. 5–7, 1982 pp. 282–298). The vulcanisates have a high hardness and a high strength, as well as a high rebound elasticity.

Polychloroprene is also of interest for the production of damping components due to its desirable properties, such as oil, heat and ozone resistance. If the damping of mechanical oscillations is to be effected by the rubber itself rather than by secondary media, such as oil, water or air, then large amounts of filler are incorporated which reduce the rebound elasticity, but have no adverse effect on the mechanical properties of the vulcanisates, such as hardness, elasticity, strength and elongation at break.

Surprisingly, it has now been found that vulcanisates of polychloroprene materials containing fluorinated polyolefin in contrast to vulcanisates of polychloroprenes currently commercially available have a clearly decreased rebound elasticity without making the mechanical properties significantly poorer.

An object of the present invention is also materials comprising:
(A) from 50 to 99, preferably from 70 to 97, more preferably from 80 to 95, %, by weight, of polychloroprene; and
(B) from 1 to 50, preferably from 3 to 30, more preferably from 5 to 20, %, by weight, of fluorinated polyolefin;
the percentages being based on (A)+(B).

Suitable polychloroprenes (A) are chloroprene polymerisates, which, in addition to polymerised 2-chloroprene units, may contain from 0.05 to 30, preferably from 0.1 to 20, %, by weight, based on the chloroprene polymerisates, of copolymerised units of other ethylenically unsaturated monomers or sulphur, that is polychloroprenes as they are described, for example, in "Methoden der Organischen Chemie" (Houben-Way) Vol E20/2, 842–859, Georg Thieme Verlag, Stuttgart—New York 1987.

They generally have Mooney viscosities (according to DIN 53 523) of from 5 to 140, preferably from 10 to 120, (ML 1+4)/100° C. and glass transition temperatures of below 0° C., preferably below −25° C.

Preferred ethylenically unsaturated "other monomers" which may be copolymerised with chloroprene are particularly 2,3- dichlorobutadiene and 1-chlorobutadiene. Sulphur-modified polychloroprenes (A) are preferred.

The amount of elemental sulphur used for the production of sulphur-modified polychloroprenes is generally from 0.05 to 1.5, preferably from 0.1 to 1, %, by weight, based on the monomers used. If sulphur donors are employed, the amount thereof should be calculated in such a way that the sulphur liberated corresponds to the amounts stated above.

The polychloroprenes (A) may either be uncrosslinked, i.e. toluene-soluble, or cross-linked. The cross-linkage may be effected by an increased conversion of monomers or by an addition of monomers having a cross-linking effect at polymerisation.

The production of polychloroprenes (A) may be undertaken by a generally known method, e.g. by emulsion polymerisation at from 0° to 70° C., preferably from 5° to 50° C.

For viscosity control of the polychloroprenes (A), the production may be undertaken in the presence of conventional chain transfer agents, such as mercaptans as described, for example, in DE-OS 3,002,711, GB-PS 1,048,235, FR-PS 2,073,106, or xanthogene disulphides as described, for example, in DE-AS 1,186,215, DE-OS 2,156,453; 2,306,610 and 3,044,811, EP-PS 53 319, GB-PS 512,458 and 952,156 and U.S. Pat. Nos. 2,321,693 and 2,567,117.

In sulphur-modified polychloroprenes (A), the desired viscosity may be adjusted by using the conventional peptisation agents as described, for example, in DE-OS 1,911,439; 2,018,736; 2,755,074 and 3,246,748, DE-PS 2,645,920, EP-A 21 212 and 200 857, FR-PS 1,457,004 and U.S. Pat. Nos. 2,264,713; 3,378,538; 3,397,173 and 3,507,825.

The polychloroprenes (A) may, of course, also be mixtures of different chloroprene polymerisates.

Generally, the fluorinated polyolefins (B) are of high molecular weight and have glass transition temperatures of above −30° C., preferably above 100° C., fluorine contents of from 59 to 76, preferably from 65 to 76, more preferably from 70 to 76, %, by weight, and mean particle diameters ($d_{50}$) of from 0.05 to 2, preferably from 0.08 to 1, μm. Preferred fluorinated polyolefins (B) are polytetrafluoroethylene, polyvinylidene fluoride, tetrafluoroethylene/hexafluoropropylene— and ethylene/tetrafluoroethylene-copolymers. The fluorinated polyolefins are well known (see Schildknecht, "Vinyl and Related Polymers", John Wiley & Sons, Inc., New York, 1952, pages 484–494; Wall "Fluorpolymers", Wiley-Interscience, John Wiley & Sons, Inc., New York, Volume 13, 1970, pages 623–654; "Modern Plastics Encyclopedia", 1970–1971, Volume 47, No. 10 A, October 1970, McGraw Hill, Inc., New York, pages 134, 138 and 774; "Modern Plastics Encyclopedia", 1975–1976, October 1975, Volume 52, No. 10 A, McGraw Hill, Inc., New York, pages 27, 28 and 472; K. Hintzer, "Methoden der Organischen Chemie" [Methods of Organic Chemistry] (Houben-Weyl), Vol. E20/2, 1030–1041, Georg Thieme Verlag, Stuttgart—New York 1987, and U.S. Pat. Nos. 3,671,487, 3,723,373 and 3,838,092).

The fluorinated polyolefins (B) are preferably used in an unsintered form.

According to a preferred embodiment of the present invention aqueous dispersions of polychloroprene (A) and of fluorinated polyolefin (B) are mixed, the polymerisates are jointly precipitated and processed by a generally known method.

Dispersions of polychloroprene (A) preferred for this purpose have solids contents of from 10 to 60, preferably from 20 to 40, %, by weight, and dispersions of fluorinated polyolefin (B) preferred for this purpose have solids contents of from 30 to 70, preferably from 50 to 60, %, by weight. The mean particle diameters ($d_{50}$) present in the dispersions are preferably from 0.03 to 0.08, more preferably from 0.1 to 0.5, μm.

If, according to the preferred embodiment as described above, mixtures of aqueous dispersions of the polychloroprene (A) and the fluorinated polyolefin (B) are precipitated together, then they may be processed conventionally, e.g. by spray drying, freeze-drying or coagulation by means of an addition of inorganic or organic salts, acids, bases or organic solvents miscible with water, such as alcohols and ketones, preferably at temperatures of from 20° to 150° C., more preferably from 50° to 100° C. Drying may be carried out at from 50° to 200° C., preferably from 70° to 150° C.

As a variant of the preferred embodiment according to which the polychloroprene (A) and the fluorinated polyolefin (B) are precipitated together, the jointly precipitated product ((A)+(B)) may be combined with polychloroprene (A) (which is free of fluorinated polyolefin (B)). According to this alternative, for example, these may be mixed:

(a) from 25 to 75, preferably from 40 to 60, parts, by weight, of polychloroprene (A) and fluorinated polyolefin (B) which have been jointly precipitated from a mixture of aqueous dispersions of both polymers;

(b) from 75 to 25, preferably from 60 to 40, parts, by weight, of polychloroprene (A) (which is free from fluorinated polyolefin (B)); and, if necessary, (c) a sufficient amount of fluorinated polyolefin so that after mixing of the components (a)+(b)+(c), the required content of fluorinated polyolefin is obtained.

Alternatively, (a) polychloroprene (A) and fluorinated polyolefin (B), which have been jointly precipitated from a mixture of aqueous dispersions of both polymers; and (b) fluorinated polyolefin (B) may, of course, be used together.

The materials according to the present invention containing the components (A) and (B) generally have Mooney viscosities of from 5 to 150, preferably from 10 to 120, (ML 1+4)/100° C.

The present materials containing the components (A) and (B) may be vulcanised in the presence of vulcanising accelerators selected from zinc and/or magnesium oxides, if necessary after addition of fillers and if necessary after further additions, at an elevated temperature, preferably from 100° to 250° C.

Rubber items made of vulcanisates of the materials in accordance with the present invention are excellently suited as damping components, e.g. engine mounts, torsional, oscillation dampers and similar items.

The parts stated in the following Examples are parts, by weight; percentages are %, by weight.

Examples

I. Preparation of the starting materials

Latex A (=aqueous dispersion of a chloroprene ⅔-dichlorobutadiene copolymer)

Into the first reactor of a polymerisation cascade, comprising 7 identical reactors each having a volume of 50 liters, the aqueous phase (W) and the monomer phase (M) were introduced via a measuring and control apparatus in a constant ratio and also the activator phase (A). The mean residence time per vessel was 25 minutes.

| (M) = monomer phase: | |
|---|---|
| chloroprene | 95 parts |
| 2,3-dichlorobutadiene-(1,3) | 5.7 parts |
| n-dodecyl mercaptan | 0.22 parts |
| phenothiazine | 0.015 parts |
| (W) = aqueous phase: | |
| deionised water | 125 parts |
| sodium salt of the disproportionated abietic acid | 2.8 parts |
| sodium salt of a condensation product of naphthalene sulphonic acid and formaldehyde | 0.7 parts |
| potassium hydroxide | 0.6 parts |
| (A) = activator phase: | |
| 1% aqueous formamidine sulphinic acid solution | 0.05 parts |

The reaction started easily at an internal temperature of 40° C. The liberated heat of polymerisation was dissipated by an external cooling system and the polymerisation temperature was maintained at 45° C. On reaching a monomer conversion of 65%, the reaction was terminated by the addition of phenothiazine. The residual monomer was removed by steam distillation under reduced pressure. The pH of the latex was decreased to a value of 6.5 using acetic acid (latex A).

Polychloroprene A

The polymerisate was isolated from latex A by freeze-coagulation. The Mooney viscosity was 46 (ML 1+4)/100° C.

Latex B (=aqueous dispersion of a sulphur-modified chloroprene/2,3-dichlorobutadiene copolymer)

988 g of 2-chloroprene and 12 g of 2,3-dichlorobutadiene were emulsified in 1,250 g of water to which were added 50 g of a 70% aqueous solution of a disproportionated resinic acid, 5 g of a sodium salt of a naphthalene sulphonic acid-formaldehyde condensation product, 5 g of potassium hydroxide, 3 g of anhydrous sodium pyrophosphate, 5 g of triisopropanolamine and 10 g of an aqueous sulphur dispersion (50%).

The emulsion was purged with nitrogen, heated to 50° C. and started by the addition of a catalyst solution. During polymerisation, catalyst solution was further introduced in such a way that the temperature of the mixture did not exceed 50° C. After a monomer conversion of 60%, 10 g of tetraethyl thiuram disulphide were added as a 15% solution in chloroprene. When a conversion of 66% was achieved, the polymerisation was stopped by the addition of diethylhydroxylamine (in the form of a 2.5% aqueous solution). The residual monomer was removed by steam distillation under reduced pressure. The latex obtained in this way was subsequently peptised for 20 hours at 25° C. in the presence of 1 g of n-dibutylamine and 12 g of tetraethyl thiuram disulphide. The pH of the latex was decreased to 6.5 using acetic acid (latex B).

Polychloropene B

The polymerisate was isolated from latex B by freeze-coagulation. The Mooney viscosity was 33 (ML 1+4)/100° C.

Latex C (=aqueous dispersion of polytetrafluoroethylene)

®Teflon 30-N by Du Pont
PTFE

The polymerisate was precipitated from latex C using calcium chloride.

Examples 1 to 6

The latices A or B, respectively, were mixed with latex in amounts as indicated below (based on solids) and precipitated at pH 6.5 by freeze-coagulation and processed.

TABLE 1

| Example | Latex A [parts] | Latex B [parts] | Latex C [parts] | Mooney viscosity of the mixture obtained* [(ML 1 + 4)/100° C.] |
|---|---|---|---|---|
| 1 | 98 | | 2 | 44 |
| 2 | 95 | | 5 | 46 |
| 3 | 93 | | 7 | 50 |
| 4 | 90 | | 10 | 50 |
| 5 | 80 | | 20 | 49 |
| 6 | | 98 | 2 | 31 |
| Comparison 1 | Polymer A | | | 46 |
| Comparison 2 | Polymer B | | | 33 |

*Test on crude rubber according to DIN 53 523, parts 1–3.

Mixtures obtained from the crude rubbers were prepared according to the following formulations and these were vulcanised.

| Formulation 1 | [parts] |
|---|---|
| crude rubber | 100 |
| magnesium oxide [1] | 4 |
| zinc oxide [2] | 5 |
| stearic acid | 1 |
| age-protecting agent [3] | 1.5 |
| anti-ozonants [4] | 1.5 |
| ozone-protecting wax [5] | 2 |
| carbon black N-220 [6] | 35 |
| carbon black N-774 [7] | 25 |
| kaolin [10] | 65 |
| dispersing agent and lubricant [8] | 3 |
| softener [9] | 25 |
| ethylene thiourea | 2 |
| diphenylthiourea | 2 |

| Formulation 2 | [parts] |
|---|---|
| crude rubber | 100 |
| carbon black N-762 | 75 |
| polyether polythioether | 10 |
| styrenated diphenylamine | 2 |
| N-isopropyl-N'-phenyl-p-phenylene diamine | 0.5 |
| stearic acid | 0.5 |
| magnesium oxide | 4 |
| zinc oxide | 5 |

[1] Maglite D by Merck & Co.
[2] Zinc oxide, active by Bayer AG; highly disperse precipitated zinc oxide
[3] Vulkanox OCD by Bayer AG
[4] Antiozonant AFD by Bayer AG
[5] Ozone-protecting Wax 110 by Bayer AG
[6] Corax 6 by Degussa
[7] Durex 0 by Degussa
[8] A Flux S by Rhein-Chemie
[9] Vulkanol OT by Bayer AG
[10] Kaolin KTG by Geisenheimer Kaolinwerke Erbslöh and Co.

For the vulcanisates obtained (formulation 1: 150° C./40 minutes; formulation 2: 150° C./20 minutes), tensile strength, elongation at break and the modulus at 100% elongation were tested accordingly to DIN 53 504, as well as the rebound elasticity according to DIN 53 512 and the tear resistance according to DIN 53 515.

TABLE 2

| | | Vulcanisable Properties | | |
|---|---|---|---|---|
| Example | Formulation | Tensile Strength (MPa) | Tear Resistance (N/mm) | Rebound Elasticity (%) |
| 1 | 1 | 8.6 | 12 | 33 |
| 2 | 1 | 8.6 | 13 | 27 |
| 3 | 1 | 9.8 | 12 | 25 |
| 4 | 1 | 10.1 | 13 | 21 |
| 5 | 1 | 12.1 | 14 | 6 |
| 6 | 2 | 15.7 | 14 | 34 |
| Comparison 1 | 1 | 9.0 | 12 | 35 |
| Comparison 2 | 2 | 16.0 | 14 | 36 |

We claim:

1. A method for the production of a polychloroprene material suitable for making high-damping vulcanisates, comprising the steps
    (a) mixing an aqueous dispersion of a polymerisate (A) of from 50 to 99% by weight polychloroprene with an aqueous dispersion of a polymerisate (B) of from 1 to 50% by weight fluorinated polyolefin, the weight percentages being based on (A) plus (B);
    (b) precipitating the aqueous polymerisate mixture; and
    (c) spray drying the precipitate to form the polychloroprene material.

2. The method of claim 1 wherein step (c) is replaced with step
    (d) freeze-drying the precipitate to form the polychloroprene material.

3. The method of claim 1 wherein the aqueous polymerisate mixture formed in step (a) is comprised of an aqueous dispersion of polymerisate (A) of from 70 to 97% by weight polychloroprene and an aqueous dispersion of polymerisate (B) of from 3 to 30% by weight fluorinated polyolefin, the weight percentages being based on (A) plus (B).

4. The method of claim 2 wherein the aqueous polymerisate mixture formed in step (a) is comprised of an aqueous dispersion of polymerisate (A) of from 70 to 97% by weight polychloroprene and an aqueous dispersion of polymerisate (B) of from 3 to 30% by weight fluorinated polyolefin, the weight percentages being based on (A) plus (B).

5. The method of claim 1 wherein the aqueous polymerisate mixture formed in step (a) is comprised of an aqueous dispersion of polymerisate (A) of from 80 to 95% by weight polychloroprene and an aqueous dispersion of polymerisate (B) of from 5 to 20% by weight fluorinated polyolefin, the weight percentages being based on (A) plus (B).

6. The method of claim 2 wherein the aqueous polymerisate mixture formed in step (a) is comprised of an aqueous of polymerisate (A) of from 80 to 95% by weight polychloroprene and a latex of polymerisate (B) of from 5 to 20% by weight fluorinated polyolefin, the weight percentages being based on (A) plus (B).

7. A polychloroprene material, comprising a precipitated mixture of an aqueous dispersion of a polymerisate (A) of from 50 to 99% by weight polychloroprene with an aqueous dispersion of polymerisate (B) of from 1 to 50% by weight fluorinated polyolefin, the weight percentages being based on (A) plus (B) and the mixture is freeze-dried.

8. A polychloroprene material, comprising a freeze-dried precipitate from a mixture of an aqueous dispersion of a polymerisate (A) of from 50 to 99% by weight polychloroprene with an aqueous dispersion of a polymerisate (B) of from 1 to 50% by weight fluorinated polyolefin, the weight percentages being based on (A) plus (B).

9. A vulcanisate prepared from the polychloroprene material of claim 7.

10. A vulcanisate prepared from the polychloroprene material of claim 8.

* * * * *